United States Patent [19]
Hotier et al.

[11] Patent Number: 6,017,448
[45] Date of Patent: Jan. 25, 2000

[54] APPARATUS AND PROCESS FOR FLUSHING A SIMULATED MOVING BED COMPRISING AT LEAST TWO FLUID DISTRIBUTION LINES

[75] Inventors: Gérard Hotier, Rueil Malmaisob; France Chopinet, Marly le Roi; Robert Jacob, Chaponost; Francis Nativel, Le Chesnay, all of France

[73] Assignee: Institut Francasis du Petrole, Rueil Malmaison Cedex, France

[21] Appl. No.: 09/119,020

[22] Filed: Jul. 20, 1998

Related U.S. Application Data

[62] Division of application No. 08/903,510, Jul. 30, 1997, Pat. No. 5,882,523.

[30] Foreign Application Priority Data

Jul. 31, 1996 [FR] France .................................. 96 09773

[51] Int. Cl.[7] .................................................. B01D 15/08
[52] U.S. Cl. ........................................ 210/198.2; 210/659
[58] Field of Search ..................................... 210/635, 656, 210/662, 659, 198.2; 127/46.1, 46.2

[56] References Cited

U.S. PATENT DOCUMENTS

| | | | |
|---|---|---|---|
| 4,402,832 | 9/1983 | Gerhold | 210/659 |
| 4,498,991 | 2/1985 | Oroskar | 210/659 |
| 4,724,081 | 2/1988 | Kawahara . | |
| 4,970,002 | 11/1990 | Ando | 210/659 |
| 4,990,259 | 2/1991 | Kearey | 210/659 |
| 5,064,539 | 11/1991 | Tanimura | 210/659 |
| 5,093,004 | 3/1992 | Hotier | 210/659 |
| 5,114,590 | 5/1992 | Hotier | 210/659 |
| 5,156,736 | 10/1992 | Schoenrock | 210/264 |
| 5,422,007 | 6/1995 | Nicoud | 210/659 |
| 5,470,464 | 11/1995 | Priegnitz | 210/659 |
| 5,578,215 | 11/1996 | Hotier | 210/659 |
| 5,578,216 | 11/1996 | Hotier | 210/659 |

FOREIGN PATENT DOCUMENTS

| | | | |
|---|---|---|---|
| 0 075 611 | 4/1983 | European Pat. Off. | 210/659 |
| 0 415 822 | 3/1991 | European Pat. Off. | 210/659 |
| 0 688 590 | 12/1995 | European Pat. Off. | 210/659 |

*Primary Examiner*—Ernest G. Therkorn
*Attorney, Agent, or Firm*—Millen, White, Zelano & Branigan, P.C.

[57] ABSTRACT

An apparatus and process are described for simulated moving bed separation in which line containing fluid containing the desired product is flushed at least once by a secondary fluid entering each distribution plate or by a fluid leaving each of said plates during at least a portion of a period of time between two successive permutations of the principal supply lines and the principal extraction lines, or during the entirety of said periods, the secondary fluid being selected from the group formed by the solvent, the fluid containing the desired product and the fluid containing the desired product freed of at least a portion of the solvent.

6 Claims, 2 Drawing Sheets

6,017,448

APPARATUS AND PROCESS FOR FLUSHING A SIMULATED MOVING BED COMPRISING AT LEAST TWO FLUID DISTRIBUTION LINES

This is a division, of application Ser. No. 08/903,510 filed Jul. 30, 1997, now U.S. Pat. No. 5,882,523.

FIELD OF THE INVENTION

This invention concerns a rinsing or flushing apparatus and process in a simulated moving bed separation apparatus comprising at least two circulation lines connecting the distribution plates to external fluids.

BACKGROUND OF THE INVENTION

The prior art is particularly illustrated in European patents EP-A-0 688 590, EP-A-0 415 822, EP-A-0 075 611 and U.S. Pat. No. 5,156,736.

In simulated moving bed separation processes such as those carried out in the "Sorbex" series of processes, among them the PAREX®, MOLEX®, SAREX®, OLEX®, and EBEX® processes, a plurality of beds are used which are localised in one or two adsorption columns. Each distributor plate situated between two consecutive beds is connected to the exterior by means of a single line leading into a rotary valve which brings each of the beds in succession into communication with each of the streams entering or leaving the adsorption section in sequence. Such streams comprise:

1) the feed to be separated constituted by a mixture of at least two products: A the most adsorbed in the beds and B the least adsorbed, or retarded, in the beds;
2) the solvent or desorbent which elutes or desorbs the constituents of the feed;
3) the extract, constituted by a mixture of the most adsorbed product (A) and the desorbent;
4) the raffinate, constituted by a mixture of the least adsorbed product (B) and desorbent;
5) the in flush, or in rinse, constituted by a mixture of extract and desorbent, which can flush the slug of feed trapped in the common line after the feed has been introduced into the adsorber into the interior of the adsorber;
6) the out flush, or out rinse, constituted by a mixture of extract and desorbent, which draws the slug of extract which is trapped in the common line after the extract has been extracted from the adsorber toward the exterior. The in flush and out flush flow rates are equal, and a pump places the out flush stream in communication with the in flush. The flush flow rate is calculated so that the volume of the longest line connecting the rotary valve to the furthest bed is flushed 2 to 3 times during a permutation period;
7) the secondary flush can be constituted either by desorbent, or by extract which is depleted in desorbent. Its aim is to flush the extremity of the common line so as to flush any impurity which may have lodged there by diffusion or exchange into the interior of the adsorber just before extracting the extract.

The disadvantage of this type of process is that each of the common lines must be flushed between introducing the feed and extracting the extract and between extracting the extract and introducing the desorbent, if a high purity of constituent A is desired in the extract. The flush flow rate linked to the highest volume of flushed line is far from negligible in the light of the feed flow rate, and it has the effect of causing the system to operate slightly off the optimum flow rate in the different zones.

A further disadvantage of coupling by means of the rotary valve of the in flush and out flush is that this requires a pump, a flow meter and a flow rate regulating valve since during a cycle, the pressure of the out flush can easily be lower than the pressure of the in flush.

Further, the flow rate regulating system in the in flush, out flush loop is not particularly suitable for a programmable flow rate which varies, for example, from zero over a certain portion of the period to a certain reference value during another portion of the period, thus allowing effective flushing with a minimum displaced volume.

An alternative technique which is used in the Eluxyl process, for example, consists of connecting each distributor plate located between two consecutive beds to the exterior by at least two distinct circulation or distribution lines.

It also contains a distinct on-off valve per distributor plate and per principal entering or leaving stream (desorbent, extract, feed, raffinate).

In principle, if one of the two lines is used for "clean" fluids (desorbent or extract), and the other is used for "dirty" fluids (feed or raffinate), flushing each of the two common lines becomes superfluous. If not just two lines dedicated to "clean" and "dirty" fluids are used, but four distinct lines are used each connecting each of the principal streams to the distributor plate, flushing such lines is in principle of no use.

However, each of such lines leads into the principal stream circulating from one bed to the next and the extremity of the two lines (dedicated to clean and to dirty fluids) or the extremity of the four lines dedicated to extract, raffinate, feed or desorbent may be contaminated by exchange or diffusion with the principal fluid. When the purity and yield are to be maximised, such contamination becomes deleterious.

SUMMARY OF THE INVENTION

The aim of the invention is thus to overcome this disadvantage by carrying out flushes where the volumes or flow rates are as small as possible and in any case lower than those of processes using a rotary valve and a single line which is common to the four principal streams per bed.

A second aim of the invention is to minimise the flushing volumes by increasing their efficiency, by flushing at a very high flow rate for only a portion of the period.

More precisely, the invention concerns a counter-current or co-current simulated moving bed separation apparatus which is combined with a line flushing apparatus which transports various fluids. In more detail, there is provided a simulated moving bed separation apparatus comprising a plurality of interconnected chromatographic columns or column sections (2, 4, 6), a fluid distributor plate (3) between each column section, at least two (10, 30) and at most four (10, 20, 30, 40) distinct circulation lines connected to the distributor plate (3), each circulation line being connected to a different line selected from two supply lines (100, 300) by which the feed and the desorbent enter and two extraction lines (200, 400) by which a fluid containing the desired product and a fluid containing the unwanted product or products leave; in which a first circulation line (10) is connected to two lines (100, 200) in which the desorbent and the fluid containing the desired product circulate respectively, a second circulation line (30) is connected to a feed supply line (300) and a third circulation line is connected to an extraction line for fluid containing the unwanted product (400); or in which a first circulation line is connected to two lines (300 and 400) in which the feed and the fluid containing the unwanted product or products respectively circulate, a second circulation line is connected to a desorbent supply line (100), and a third line is connected to a line for extracting fluid containing the desired product (200); or in which a circulation line (10) is connected to two lines in which the desorbent (100) and the fluid containing the desired product (200) respectively circulate, and the other circulation line (30) is connected to two lines in which the feed (300) and the fluid containing the unwanted product or products (400) circulate respectively. The apparatus is characterized in that the line (10) for circulating the fluid containing the desired product comprises a flushing line (250) for a secondary incoming fluid (desorbent, fluid containing the desired product or fluid containing the desired product depleted in desorbent) or for an outgoing fluid (250) (mixture of desorbent and fluid containing the desired product).

At least one other of the circulation lines (30) can comprise a flushing line (350) for a fluid (desorbent) entering the distributor plate or for a fluid (350) leaving the distributor plate (feed, fluid containing the unwanted products).

In a first variation, the fluid in flush line (250 or 350) comprises at least one pressurised chamber or a pump (101 or 253) for supplying said fluid respectively connected to a flow rate regulation means (351, 352 or 256, 257, FIG. 1).

In a second variation, the fluid out flush line (350 or 250) comprises a flow rate regulation means (352, 351 or 256, 257).

To use the apparatus, a simulated moving bed separation process is provided which is carried out in a separation zone or adsorber comprising a plurality of interconnected columns or column sections, a fluid distributor plate between each column section, at least two (10, 30) and at most four (10, 20, 30, 40) distinct circulation lines connected to the distributor plate, each line being connected to a different line of the four lines containing the four principal streams (fluid containing the desired product, fluid containing the unwanted product, feed, desorbent); in which a first circulation line (10) is connected to two lines (100, 200) in which the desorbent and the fluid containing the desired product circulate respectively, a second circulation line (30) is connected to a feed supply line (300) and a third circulation line is connected to an extraction line for fluid containing unwanted product (400); or in which a first circulation line is connected to two lines (300 and 400) in which the feed and the fluid containing the unwanted product or products respectively circulate, a second circulation line is connected to a desorbent supply line (100), and a third line is connected to a line for extracting fluid containing the desired product (200); or in which a circulation line (10) is connected to two lines in which the desorbent (100) and the fluid containing the desired product (200) respectively circulate, and the other circulation line (30) is connected to two lines in which the feed (300) and the fluid containing the unwanted product or products (400) circulate respectively. The process is characterized in that the line (10) containing the fluid containing the desired product is flushed at least once with a secondary fluid entering each distributor plate or by a fluid leaving each of said plates during at least a portion of a period of time between two successive permutations of the principal supply lines and the principal extraction lines, or during the totality of said periods, the secondary fluid being selected from the group formed by the desorbent, the fluid containing the desired product and the fluid containing the desired product freed of at least a portion of the desorbent.

In one feature of the process regarding the lines for the "clean" fluids, the line (10) containing the fluid containing the desired product is flushed by the secondary fluid which is of substantially the same composition during at least a portion of the period, said flushing being sequential, one plate at a time, all of the plates being flushed successively during the course of one cycle.

Said line can be sequentially flushed by the secondary fluid, downstream of the extract extraction and upstream of the feed supply if the desired product is in the extract and downstream of the raffinate and upstream of the desorbent if the desired product is in the raffinate.

Said line (10) containing the fluid containing the desired product can be flushed by the fluid containing the desired product or the desorbent or said fluid depleted in desorbent, upstream of the feed supply for a portion of the period then downstream of the extract extraction during a further portion of the period, the two positions thus defined being distinct, if the desired product is in the extract.

In a variation, said line is continuously flushed by the secondary fluid over all of the plates at once during all of the periods of the cycle.

Further, the lines containing a "dirty" fluid (for example feed or raffinate) can also be flushed.

Thus in a first variation, the line (30) containing the fluid containing the unwanted product or products is sequentially flushed at least once with desorbent entering the distributor plate between the extract extraction and the feed supply during at least a portion of the period, preferably during the entire period, when the desired product is in the extract.

In a second variation, the line containing the fluid containing the unwanted product or products is sequentially flushed at least once with the fluid contained in the desorption zone for the desired product which leaves a distributor plate between the desorbent supply and the extract extraction, preferably near the desorbent supply, during at least a portion of the period.

Finally, in a third variation, the lines containing the unwanted product or products from all of the distributor plates are continuously flushed using the fluid contained in the adsorber.

In a further characteristic of the invention, when the distributor plate comprises three or four circulation lines, the line transporting the desorbent (100) can be flushed by desorbent (line 150).

The line containing the fluid containing the desired product can be flushed with a ratio of the flushing fluid flow rate to the feed flow rate which is in the range 0.005 to 0.4, advantageously in the range 0.02 to 0. 15, and preferably in the range 0.04 to 0.08.

The same ratio can be used for flushing the line containing the fluid containing the unwanted product.

BRIEF DESCRIPTION OF DRAWINGS

The invention will be better understood from the figures which schematically show embodiments of the invention, in which.

DETAILED DESCRIPTION OF DRAWINGS

A simulated moving bed separation unit is constituted by at least one column 1 separated into a plurality of beds or sections 2, 4, 6 . . . , the number of beds being in the range 4 to 24. Each bed is filled with an adsorbent, for example an X or Y zeolite exchanged with a group Ia cation and a group Ia cation, when para-xylene is to be separated from a $C_8$ aromatic cut.

Apart from the bed located at the lower extremity of each column, each bed is separated from the bed immediately below it by a distributor 3, 5 . . . This distributor is connected to the exterior of the column by either 2 circulation lines (10 and 30), see FIG. 1, or by 4 circulation lines (10, 20, 30, 40), see FIG. 2.

Figure 1:
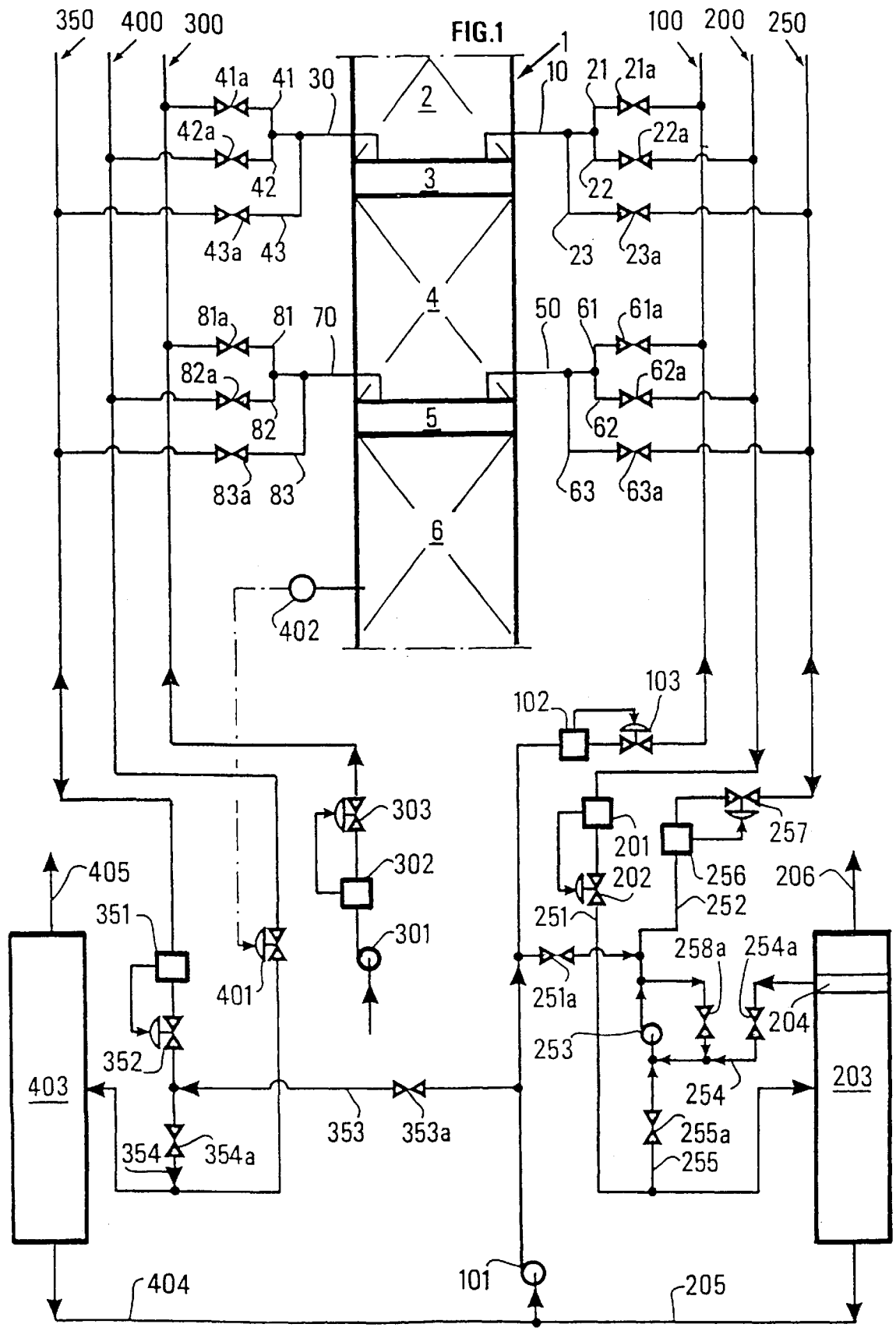
FIG. 1 shows the flushing apparatus when each fluid distributor comprises two circulation lines (10 and 30)
Figure 2:
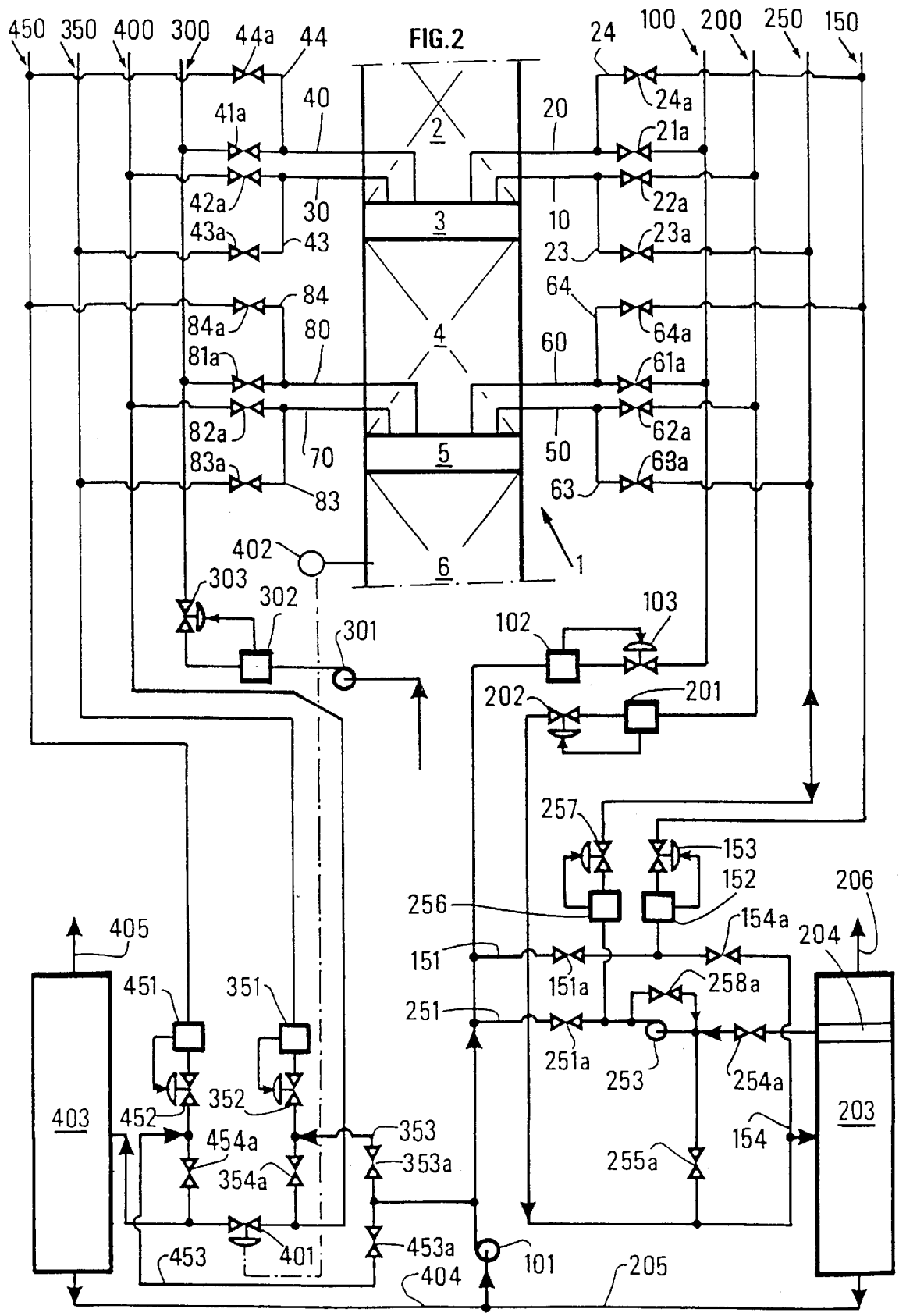
FIG. 2 shows a flushing apparatus when each distributor is connected to four fluid circulation lines (10, 20, 30, 40).

Referring to FIGS. 1 and 2, a desorbent line 100 supplies each bed via valves 21a, 61a. Desorbent is successively sent to each bed via line 100 by means of a pump 101 and its flow rate is precisely regulated by means of a flow meter 102 and a control valve 103.

An extraction line 200 serves each of the beds via valves 22a, 62a. The extract is successively extracted from each bed at a controlled flow rate via line 200 by means of a flow meter 201 and valve 202 then directed to distillation column 203 where para-xylene, for example, is extracted overhead via line 206 while desorbent constituted essentially by para-diethylbenzene is extracted via line 205 before being returned to pump 101. This column also comprises an extraction plate 204 for extracting an extract which is depleted in desorbent.

A feed line 300 serves each bed via valves 41a, 81a. The feed is successively sent to each bed via line 300 by means of a pump 301 and its flow rate is precisely regulated by means of a flow meter 302 and a control valve 303. Raffinate is successively extracted from each bed under controlled pressure via line 400 by means of control valve 401 and pressure sensor 402 located on the column. It is directed to a distillation column 403 where a mixture of paraffins and naphthenes, ethylbenzene, meta-xylene and ortho-xylene, for example, is extracted overhead via line 405 while the desorbent constituted essentially by para-diethylbenzene is extracted via line 404 towards pump 101.

Referring to FIG. 1 alone, the distributor plates communicate with the exterior via two lines: 10 and 30 for plate 3, 50 and 70 for plate 5, and so on. Lines 10, 50 lead into lines 21, 22 and 23 and into lines 61, 62, 63 respectively. These lines transport the clean fluids, for example extract and desorbent if the desired product is in the extract. These lines 10, 50 can be flushed either continuously or sequentially by means of lines 23, 63 and valves 23a, 63a respectively. When flushing is to be continuous, valves which can regulate a constant and substantially even flow rate whatever the introduction position are used. In contrast, when flushing is to be sequential, on-off valves are used. Valves 23a, 63a can place each distributor 3, 5 in communication with a line 250 to either extract or inject a flushing fluid into lines 10, 50. The following can be injected via line 250:

either desorbent, in which case valve 251a is opened and the flow rate is regulated using flow meter 256 and control valve 257 (valves 254a, 255a and 258a are closed);

or extract, in which case valve 255a is opened. Pump 253, flow meter 256 and control valve 257 send a regulated flow of extract to line 250 (valves 251a, 254a and 258a are closed);

or extract which is depleted in desorbent, in which case valve 254a is opened, pump 253, flow meter 256 and control valve 257 send a regulated flow of depleted extract to line 250 (valves 251a, 255a and 258a are closed).

The contents of lines 10, 50 can be extracted via line 250. Valves 255a and 258a are opened (valves 251a, 254a are closed), and flow meter 256 and control valve 257 extract a regulated flow of extract-desorbent mixture and send it to distillation column 203.

Lines 30, 70 lead into lines 41, 42, 43 and lines 81, 82, 83 respectively. These lines transport the dirty fluids, for example the raffinate and feed if the desired product is in the extract. These lines 30, 70 can be flushed either continuously or sequentially by means of lines 43, 83 and valves 43a, 83a. When flushing is to be continuous, valves which can regulate a constant and even flow rate whatever the introduction position are used. In contrast, when flushing is to be sequential, on-off valves are used. Valves 43a, 83a can place each distributor 3, 5 in communication with a fine 350 to either extract or inject a flushing fluid into lines 30, 70.

Desorbent can be injected via line 350, in which case valve 353a is opened, valve 354a is closed, and control valve 352 and flow meter 351 regulate the injection flow rate.

A mixture of feed and raffinate can be extracted via line 350 and returned to distillation column 403 (valve 354a open and valve 353a closed) at a flow rate which is regulated by control valve 32 and flow meter 351.

Referring to FIG. 2 alone, the distributor plates communicate externally with four circulation lines:

10, 20, 30, 40 for plate 3;
50, 60, 70, 80 for plate 5.

Lines 24, 64 are connected to lines 20, 60. Lines 20, 60 exclusively transport desorbent from line 100 or desorbent for flushing from line 150 via valves 24a, 64a. They can be flushed either continuously or sequentially by means of lines 24, 64. When flushing is to be continuous, valves which can regulate a constant and substantially even flow rate whatever the introduction position are used. In contrast, when flushing is to be sequential, on-off valves are used.

Valves 24a, 64a can place each distributor 3, 5 in communication with a line 150 to either extract or introduce a flushing fluid into lines 20, 60.

Desorbent can be injected via line 150. Valve 151a is opened and the flow rate is regulated by means of flow meter 152 and control valve 153 (valve 154a is closed). A mixture of desorbent and extract can be extracted via line 150: valve 154a is opened (valve 151a is closed) and the flow rate is regulated by means of flow meter 152 and control valve 153.

Lines 23, 63 are connected to lines 10, 50. Lines 10, 50 exclusively transport extract via valves 22a, 62a (towards line 200) and a flushing stream from or to line 250 via valves 23a, 63a.

They can be flushed either continuously or sequentially. When flushing is to be continuous, valves which can regulate a constant and substantially even flow rate whatever the introduction position are used. In contrast, when flushing is to be sequential, on-off valves are used.

Valves 23a, 63a can place each distributor 3, 5 in communication with line 250 to:

either inject desorbent; in which case valve 251 a is opened and the flow rate is regulated using flow meter 256 and control valve 257 (valves 254a, 255a and 258a are closed);

or inject extract; in this case, valve 255a is opened, pump 253, flow meter 256 and control valve 257 send a regulated flow of extract to line 250 (valves 251a, 254a and 258a are closed);

or inject extract which is depleted in desorbent; in which case valve 254a is opened, pump 253, flow meter 256 and control valve 257 send a regulated flow of depleted extract to line 250 (valves 251a, 255a and 258a are closed);

or extract the contents of lines 10, 50, in which case valves 255a and 258a are opened (valves 251a, 254a are closed). Flow meter 256 and control valve 257 extract a regulated flow rate of a mixture of extract and desorbent and send it to distillation column 203.

Lines 44, 84 are connected to lines 40, 80. Lines 40, 80 exclusively transport feed via valves 41a, 81a (from line 300) or desorbent for flushing the line from line 450 via valves 44a, 84a.

They can be flushed either continuously or sequentially by means of lines 44, 84. When flushing is to be continuous, valves which can regulate a constant and substantially even flow rate whatever the introduction position are used. In contrast, when flushing is to be sequential, on-off valves are used.

Valves 44a, 84a can place each distributor 3, 5 in communication with line 450 to:
either inject desorbent, in which case valve 453a is opened, valve 454a is closed and the flow rate is regulated using flow meter 451 and control valve 452;
or extract the contents of lines 40, 80, in which case valve 454a is opened, valve 453a is closed and the flow rate is regulated using flow meter 451 and control valve 452.

Lines 43, 83 are connected to lines 30, 70. Lines 30, 70 exclusively transport raffinate via valves 42a,82a (to line 400) and a flushing stream to line 350 via valves 43a, 83a.

These lines can be flushed either continuously or sequentially. When flushing is to be continuous, valves which can regulate a constant and substantially even flow rate whatever the introduction position are used. In contrast, when flushing is to be sequential, on-off valves are used.

Valves 43a, 83a can place each distributor 3, 5 in communication with line 350 to:
either inject desorbent, in which case valve 353a is opened, valve 354a is closed, and control valve 352 and flow meter 351 regulate the flow;
or a mixture is extracted from the adsorber via lines 30, 70 and returned (valve 354a open, valve 353a closed) to the raffinate distillation column 403. The flow rate is regulated by flow meter 351 and control valve 352.

The following examples illustrate the invention:

Descriptive Section which is Common to Examples 1 to 19

A simulated moving bed separation unit constituted by 24 adsorbent beds was disposed in two columns, each with twelve beds. The internal diameter of each bed was 915 mm. The heights of beds n°1 to 11 and 13 to 23 were all substantially the same while the heights of beds 12 and 24 were reduced: in accordance with French patent FR-A-2 721 529, the beds located near the recycling pumps were shorter to compensate for the effects of the dead volume in each recycling loop.

The average volume of each bed was 0.686 m$^3$, to which was added an average of 0.031 m$^3$ per bed representing the total dead volume (recycle loops and internal volumes of distributors).

A distributor between every two beds separated the beds and was connected to the exterior by two distinct lines. The first of these two lines led into a feed valve, a raffinate valve and a flushing valve for the "dirty" service line. Each on-off flushing valve was followed by a manual valve for regulating the flow rates. The second of these two lines led into a desorbent valve, an extract valve and a flushing valve for the "clean" service line.

The feed circulation line was provided with a pump, a flow rate control valve and a flow meter, and connected to each of the 24 "dirty" service lines of each stage.

The raffinate circulation line was provided with a pressure control valve and a flow meter, and connected to each of the 24 "dirty" service lines of each stage.

The "dirty" flushing circulation line was provided with a flow meter. It could be connected either to the intake of the desorbent pump or to the supply to the raffinate distillation column. Thus it could carry the in or the out flushes.

The desorbent circulation line was provided with a pump, a flow rate control valve and a flow meter, and was connected to each of the 24 "clean" service lines of each stage.

The extract circulation line was provided with a flow rate control valve and a flow meter, and connected to each of the 24 "clean" service lines of each stage.

The "clean" circulation line was provided with a pump, a flow rate control valve and a flow meter. It could be connected either to the intake of the desorbent pump or just downstream of the extract control valve, or finally to the 25$^{th}$ plate of the extract distillation column (the first forty were in the rectification zone, the last twenty were in the stripping zone). This clean flushing distribution line could thus effect in flushes of either desorbent or extract, or of extract depleted in desorbent.

The adsorbent was an X zeolite with barium as the principal compensating cation. The desorbent was constituted by 97.9% para-diethylbenzene, 1.6% meta-diethylbenzene and 0.5% of about ten different aromatic constituents containing 10 carbon atoms. The feed to be separated was constituted by 3.1% of paraffins and naphthenes, 1.2% of toluene, 11.6% of ethylbenzene, 21.9% of para-xylene, 39.1% of meta-xylene, 21.9% of ortho-xylene and 0.2% of various aromatic constituents containing 9 carbon atoms.

The unit was operated isothermally at 165° C. The pressure at the intake of the two recycling pumps was regulated at 9 bars. The compositions of the streams were obtained by the average of analysis of five series of samples (desorbent, extract, feed, raffinate) extracted every six hours. The flow rates corresponded to an average measurement over 24 hours. The purity was calculated with respect to the composition of the extract, and the yield with respect to the compositions and flow rates of the extract and raffinate. The material balances showed a difference of at most 0.3% for the major constituents ($C_8$ aromatics and para-diethylbenzene) and at most 2.6% for the minor constituents (paraffins and naphthenes, toluene, $C_9$ aromatics, meta-diethylbenzene, other $C_{10}$ aromatics).

EXAMPLE 1 (comparative, with no line flushing)

There were 5 beds in zone 1 between desorbent injection and extract extraction, 9 beds in zone 2 between extract extraction and feed injection, 7 beds in zone 3 between feed injection and raffinate extraction, and 3 beds in zone 4 between raffinate extraction and desorbent injection. The following flow rates were used for the temperature and pressure conditions: desorbent 18.3 m$^3$/h, extract 6.95 m$^3$/h, feed 11.8 m$^3$/h; raffinate 23.15 m$^3$/h. The permutation period was 56 seconds, and thus the complete cycle lasted 22 minutes 24 seconds.

The composition of the extract was: paraffins and naphthenes 0.009%; toluene 1.121%; ethylbenzene 0.055%; para-xylene 35.324%; meta-xylene 0.095%; ortho-xylene 0.048%; $C_9$ aromatics 0.017%; meta-diethylbenzene 1.021%; para-diethylbenzene 62.012%, $C_{10}$ aromatics 0.298%.

The purity was calculated with respect to the paraffins and naphthenes, ethylbenzene, meta-xylene, ortho-xylene and the $C_8$ aromatics. Toluene was not included as it was removed in a further distillation column. The purity was 99.37%. The composition of the raffinate was: paraffins and naphthenes 1.58%;

toluene 0.271%; ethylbenzene 5.887%; para-xylene 0.555%; meta-xylene 19.903%; ortho-xylene 11.65%; $C_9$ aromatics 0.097%; meta-diethylbenzene 0.952%; para-diethylbenzene 58.82%, $C_{10}$ aromatics 0.30%. The yield was thus 95%.

EXAMPLE 2: (flushing the clean line with desorbent, in accordance with the invention)

Example 1 was repeated, connecting the "clean" flushing circuit to the desorbent pump discharge. The flushing desorbent flow rate was 0.96 $m^3/h$.

The temperature and pressure were identical to Example 1. As above, there were 5 beds in zone 1, 7 beds in zone 3 and 3 beds in zone 4. However, there was one bed between the extract extraction and the flush injection (zone 5) and there were 8 beds between the flush injection and the feed injection (zone 2).

The flow rates of desorbent, feed and raffinate were strictly identical to those of Example 1. The flow rates in zone 1, zone 2, zone 3 and zone 4 were strictly identical to those of Example 1.

However, the extract flow rate was held at 7.91 $m^3/h$ and the flow rate in the bed located between the extract extraction and the flush injection (zone 5) was reduced by 0.96 $m^3/h$ relative to the above case; this meant that the average recycle flow rate remained 56.06 $m^3/h$.

Under these conditions, the para-xylene content in the extract was no more than 31.072%. The amounts of impurities were: paraffins and naphthenes 0.002%; ethylbenzene 0.044%; meta-xylene 0.051%, ortho-xylene 0.026%; $C_9$ aromatics 0.008%. The purity was thus 99.58%, and the yield was practically unchanged: 95.02%.

EXAMPLE 3 (flushing the "clean" line with desorbent)

The conditions of Example 2 were repeated, with the exception that the flow rate of the flushing desorbent was reduced from 0.96 $m^3/h$ to 0.48 $m^3/h$.

The extract flow rate was then 7.43 $m^3/h$, and the average recycle flow rate was 56.08 m 3/h.

The composition of the extract was: paraffins and naphthenes 0.002%; ethylbenzene 0.045%; para-xylene 33.044%; meta-xylene 0.0052%, ortho-xylene 0.026%; $C_9$ aromatics 0.008%. The purity was thus 99.60%, and the yield remained 95%.

EXAMPLE 4 (flushing the "clean" line with desorbent)

The conditions of Example 2 were repeated, with the exception that the flow rate of the flushing desorbent was reduced to 0.24 $m^3/h$. The extract flow rate was then 7.19 $m^3/h$, and the average recycle flow rate was 56.09 $m^3/h$. The purity was 99.59%, and the yield was 94.99%.

EXAMPLE 5 (flushing the "clean" line with desorbent)

Example 3 was repeated, changing only the distribution of beds between zones 5 and 2. There were 2 beds between the extract extraction and the flushing injection. There were 7 beds between the flushing injection and the feed injection. The average recycle flow rate changed as there was one extra bed in zone 5 and one less bed in zone 2: instead of 56.08 $m^3/h$ (Example 3), it reduced to 56.06 $m^3/h$. The purity was 99.65%, and the yield was 94.99%.

EXAMPLES 6 TO 8 (flushing the "clean" line with extract)

The clean flushing circuit was connected downstream of the extract control valve. The flushing extract flow rate was 0.48 $m^3/h$.

The flow rates in zones 1, 5, 2, 3, 4 and the desorbent, flushing, feed, extract and raffinate flow rates were identical to those of Example 3. The temperature and pressure conditions were identical to those of Examples 1 to 5.

The number of beds in zones 5 and 2 were varied as shown in Table I

TABLE I

| Example | Beds in zone 5 | Beds in zone 2 | Average recycle flow rate $m^3/h$ | Purity % | Yield % |
|---|---|---|---|---|---|
| 6 | 1 | 8 | 56.08 | 99.65 | 94.82 |
| 7 | 2 | 7 | 56.06 | 99.70 | 94.80 |
| 8 | 4 | 5 | 56.02 | 99.75 | 94.77 |

EXAMPLES 9 AND 10 (flushing of "clean" line with extract depleted in desorbent)

The "clean" flushing circuit was connected to the extraction plate of the extraction column ($25^{th}$ plate in the rectification zone). The distillation column was regulated so that the concentration of para-xylene at this plate was about 65%.

This figure corresponded to the maximum concentration of para-xylene in the adsorber. This maximum was localised in zone 2.

The flow rates in zones 1, 5, 2, 3, 4 and the desorbent, flushing, feed, extract and raffinate flow rates, also the temperature and pressure conditions were identical to those of Examples 6 to 8. The number of beds in zones 5 and 2 were varied as shown in Table II

TABLE II

| Example | Beds in zone 5 | Beds in zone 2 | Average recycle flow rate $m^3/h$ | Purity % | Yield % |
|---|---|---|---|---|---|
| 9 | 2 | 7 | 56.06 | 99.73 | 94.81 |
| 10 | 4 | 5 | 56.02 | 99.77 | 94.79 |

EXAMPLES 11 AND 12 (flushing with extract in two different positions)

The clean flushing circuit was connected downstream of the extract control valve. The flushing extract flow rate was 0.48 $m^3/h$.

The valves connected to the clean flushing circuit were activated twice during the 56 second period.

During the first part of the period, there were 7 beds between the extract extraction and the flushing injection and 2 beds between the flushing injection and the feed injection.

During the second part of the period, there were 2 beds between the extract extraction and the flushing injection and 7 beds between the flushing injection and the feed injection.

The flow rates in zones 1, 3, 4, the flow rates of desorbent, flushing, extract and raffinate, also the temperature and pressure conditions, were identical to those of Examples 6 to 8.

During the entire period, zones 2 and 5 had no more than 2 beds each and their flow rates were identical to those in Examples 6 to 8. There were alternately 5 beds in zone 5 during the first part of the period then in zone 2 during the second part of the period. To account for this particular feature, when the recycle pump was connected to these five beds, the set recycle flow rate value was the arithmetic mean of the flow rates in zone 5 and in zone 2 (Table III). A sixth zone thus existed, exactly as if two clean flushing streams were being permanently injected into two different areas of the adsorber.

TABLE III

| Example | First part s | Second part s | Average recycle flow rate m$^3$/h | Purity % | Yield % |
|---|---|---|---|---|---|
| 11 | 16 | 40 | 56.03 | 99.72 | 94.75 |
| 12 | 28 | 28 | 56.02 | 99.79 | 94.70 |

These Examples 11 and 12 should be compared with Example 7.

EXAMPLE 13 (flushing with depleted extract at two different positions)

The clean flushing circuit was connected to the extraction plate of the extraction column. The procedure was exactly as in Example 12, with the same conditions of flow rates, the same arrangement of zones 2 and 5, and the same division of time between the two parts of the 56 second period.

The purity was 99.82%, and the yield was 94.68% (compare with Examples 10 and 12).

EXAMPLE 14 (for comparison with Example 13)

The temperature was raised to 175° C. and other conditions were used: the mass flow rates were the same as in Example 13, the volume flow rates were all increased by 0.9% (in inverse proportion to the density of the feed at 165° C. and at 175° C.). The permutation period was reduced from 56 seconds to 55.6 seconds. The first and second parts of the period were each 27.8 seconds.

The purity was 99.86%, and the yield was 94.76%.

EXAMPLE 15 (sequential flushing of the clean line and continuous out flush of the dirty line)

Compared with Example n°13, the desorbent flow rate was increased by 0.24 m$^3$/h (i.e., from 18.3 m$^3$/h to 18.54 m$^3$/h). The dirty flushing line was connected to the supply to the raffinate distillation column. All of the dirty flush on-off valves were open and the flow rates were regulated for each stage so that a continuous flow rate of 0.01 m$^3$/h was extracted from each distributor. The total of the dirty flushes leaving the unit was in total 0.24 m$^3$/h. This stream was sent to the supply to the raffinate distillation column.

The purity was 99.83% and the yield was 94.27%.

EXAMPLE 16 (sequential flushing of the clean line and the dirty line)

Example 13 was repeated, with two flushing valves which were operated sequentially. There was one bed between the desorbent injection and the dirty flush extraction, and four beds between the dirty flush extraction and the extract extraction. The flow rate of the desorbent was 18.54 m$^3$/h and the dirty flush flow rate was 0.24 m$^3$/h. One period per cycle, when the recycle pump was connected to the bed in zone 7 (between the desorbent injection and the dirty flush extraction), the rate of the pump was increased by 0.24 m$^3$/h with respect to the rate in zone 1. The purity was 99.84% and the yield was 94.65%.

EXAMPLE 17 (sequential in flush between the clean and dirty lines)

The conditions of Example 10 were repeated, with the dirty flushing line being connected to the discharge of the desorbent pump. The dirty flushing on-off valves were operated sequentially. The dirty flush was injected at the same place as the clean flush: four beds after the extract extraction.

The flow rate in zone 5 dropped by 0.24 m$^3$/h, the extract flow rate increased by 0.24 m$^3$/h (from 7.43 m$^3$/h to 7.67 m$^3$/h). The average recycle flow rate reduced from 56.02 m$^3$/h to 55.98 m$^3$/h. The purity was 99.68% and the yield was 95.49%.

EXAMPLE 18 (flushing in two different positions of the clean line and sequential in flush of the dirty line)

The conditions of Examples 12 and 17 were repeated. The dirty flush was injected 7 beds after extract extraction and two beds before the feed injection. A flow rate of 0.24 m$^3$/h of desorbent was used. The average recycle flow rate was 55.95 m$^3$/h. The purity was 99.78% and the yield was 95.34%.

EXAMPLE 19 (flushing at two different positions of the "clean" line using extract depleted in desorbent and sequential flush out of the "clean" line)

The conditions of Example 14 were repeated, adding the sequential flush out described in Example 16. The purity was 99.89% and the yield was 94.67%.

The following section of the description is common to Examples 20 to 24. In the unit described above, the distributors separating the beds were replaced by distributors connected to the exterior by four distinct lines. The first of these lines led into a feed valve and a flush valve. The second of these lines led into a raffinate valve and a flush valve. The third line led into a desorbent valve and a flush valve. The fourth line led into an extract valve and a flush valve.

The composition of the feed and desorbent, also the nature of the molecular sieve, were identical to those of Examples 1 to 19.

EXAMPLE 20 (comparative)

The operating conditions of Example 1 were strictly repeated. The purity obtained was 99.19% and the yield was 96.21%.

EXAMPLE 21 (sequential flushing in two different positions of the extract line only)

The operating conditions of Example 14 were strictly repeated. The purity obtained was 99.69% and the yield was 95.95%.

EXAMPLE 22 (sequential flushing in two different positions of the extract line and sequential in flush of the desorbent line)

The conditions of Example 21 were repeated. In addition, a flushing stream constituted by 0.24 m³/h of desorbent was injected into the flushing valve connected to the desorbent line, issuing 4 beds downstream of the extract extraction. The purity obtained was 99.88%, and the yield was 95.55%.

EXAMPLE 23 (sequential flushing in two different positions of the extract line, sequential in flush of the desorbent line, sequential out flush of the feed line)

The conditions of Example 22 were repeated, increasing the desorbent flow rate by 0.24 m³/h and extracting a stream of 0.24 m³/h via the flushing valve connected to the feed line one bed downstream of the desorbent injection.

The out flush stream was sent to the feed addition line. The purity obtained was 99.90%, and the yield was 94.97%.

EXAMPLE 24 (sequential flushing in two different positions of the extract line, sequential in flush of the desorbent line, sequential out flush of the feed line, sequential out flush of the raffinate line)

The conditions of Example 23 were repeated, increasing the desorbent flow rate by 0.24 m³/h and extracting a stream of 0.24 m³/h via the flushing valve connected to the raffinate line one bed downstream of the desorbent injection. The out flush stream was sent to the raffinate distillation. The purity obtained was 99.91%, and the yield was 94.62%.

Examples 2 to 19 and 21 to 24 show that it is essential to rinse the clean line or lines to obtain large gains in purity and to separate the raffinate line and feed line to obtain gain in yield. Flushing the dirty lines only results in small gain in purity at the expense of a large drop in yield.

We claim:

1. A simulated moving bed separation apparatus comprising a plurality of interconnected chromatographic columns or column sections (2, 4, 6), a fluid distributor plate (3) between each column section, at least two (10, 30) and at most four (10, 20, 30, 40) distinct circulation lines connected to the distributor plate (3), each circulation line being connected to a different line selected from two supply lines (100, 300) by which feed and desorbent enter and two extraction lines (200, 400) by which a fluid containing desired product and a fluid containing unwanted product or products leave; in which a first circulation line (10) is connected to two lines (100, 200) in which the desorbent and the fluid containing the desired product circulate respectively, a second circulation line (30) is connected to a feed supply line (300) and a third circulation line is connected to an extraction line for fluid containing the unwanted product (400); or in which a first circulation line is connected to two lines (300 and 400) in which the feed and the fluid containing the unwanted product or products respectively circulate, a second circulation line is connected to a desorbent supply line (100), and a third line is connected to a line for extracting fluid containing the desired product (200); or in which a circulation line (10) is connected to two lines in which the desorbent (100) and the fluid containing the desired product (200) respectively circulate, and the other circulation line (30) is connected to two lines in which the feed (300) and the fluid containing the unwanted product or products (400) circulate respectively, the apparatus being characterized in that the line (10) for circulating the fluid containing the desired product comprises a flushing line (250) for a secondary incoming fluid (desorbent, fluid containing the desired product or fluid containing the desired product depleted in desorbent) or for an outgoing fluid (250) (mixture of desorbent and fluid containing the desired product).

2. An apparatus according to claim 1 in which the fluid in flush line (250 or 350) comprises at least one pressurised chamber or a pump (101 or 253) for supplying said fluid respectively connected to a flow rate regulation means (351, 352 or 256, 257, FIG. 1).

3. An apparatus according to claim 1, in which at least one other (30) of the circulation lines comprises a flushing line (350) for a fluid (desorbent) entering the distributor plate or for a fluid (350) leaving the distributor plate (feed, fluid containing the unwanted product or products).

4. An apparatus according to claim 3, in which the fluid in flush line (250 or 350) comprises at least one pressurized chamber or a pump (101 or 253) for supplying said fluid respectively connected to a flow rate regulation means (351, 352 or 256, 257, FIG. 1).

5. An apparatus according to claim 3, in which the fluid out flush line (350 or 250) comprises a flow rate regulation means (352, 351 or 256, 257, FIG. 1).

6. An apparatus according to claim 1 or claim 3, in which the fluid out flush line (350 or 250) comprises a flow rate regulation means (352, 351 or 256, 257, FIG. 1).

* * * * *